United States Patent [19]
Knipp et al.

[11] B 3,991,147
[45] Nov. 9, 1976

[54] PROCESS FOR MOLDING FOAMED PLASTICS FROM REACTION MIXTURES INVOLVING CLOSED MOLD FILLING WITH THE AVOIDANCE OF GAS BUBBLE ENTRAINMENT

[75] Inventors: Ulrich Knipp, Schildgen-Nittum; Heinrich Boden, Opladen, both of Germany

[73] Assignee: Bayer Aktiengesellschaft, Leverkusen, Germany

[22] Filed: Sept. 16, 1974

[21] Appl. No.: 506,144

[44] Published under the second Trial Voluntary Protest Program on February 10, 1976 as document No. B 506,144.

[30] Foreign Application Priority Data

Sept. 27, 1973 Germany............................ 2348658

[52] U.S. Cl. ............................ 264/51; 260/2.5 AZ; 264/45.5; 264/54; 264/328; 264/331; 264/DIG. 14; 264/DIG. 83
[51] Int. Cl.[2] .......................................... B29D 27/00
[58] Field of Search................. 264/54, DIG. 83, 51, 264/DIG. 14, 45.5, 328, 331; 260/2.5 AZ

[56] References Cited
UNITED STATES PATENTS 3,660,548   5/1972   Komada et al.................. 264/54 X
3,745,203   7/1973   Harper......................... 264/DIG. 83
3,846,524   11/1924  Elmore et al.................. 161/161 X

OTHER PUBLICATIONS

Mobay Bulletins, "The Rolling Showcase for Engineering Plastics," Pittsburgh, Pa., Mobay Chemical Co., (1968), pp. 1–8.

*Primary Examiner*—Philip Anderson
*Attorney, Agent, or Firm*—Joseph C. Gil; Gene Harsh

[57] ABSTRACT

A process for molding foam products substantially free from flaws caused by air bubbles in the foamable reaction mixture wherein a foamable reaction mixture having a viscosity $\eta$ in cP between 100 cP and 2500 cP is introduced into a mold cavity through an opening in the mold wall and against the wall of the cavity opposite the opening of a mold in which the thickness of the cavity and the thickness $s$ of the resulting molded product adjacent to the opening at the time the mixture is introduced into the cavity is maintained at 0.5 mm to 15 mm under conditions whereby the radial distribution rate $w_{radial}$ in m/sec., $\eta$ in cP and $s$ combine to satisfy the relation $$\frac{w_{radial} \ (m/sec) \cdot s \ (mm)}{\eta \ (cP)} \leq 0.5 .$$

6 Claims, 7 Drawing Figures

PROCESS FOR MOLDING FOAMED PLASTICS FROM REACTION MIXTURES INVOLVING CLOSED MOLD FILLING WITH THE AVOIDANCE OF GAS BUBBLE ENTRAINMENT

This invention relates generally to the molding of plastics and more particularly to a process for filling molds with reaction mixtures having viscosities in the range of from 100 cP to 2,500 cP, based for example on starting materials for polyurethane plastics, for example those based on unsaturated polyester resins or epoxide resins or polyisocyanurate resins, in which the reaction mixture flows through a passage into a closed mold cavity onto that wall of the mold facing the feed opening, and is distributed around the mold cavity by flowing radially downwards.

Once it had been discovered that integral skinned polyurethane foams having a substantially non-porous cover layer and a microporous core can be produced in a single operation, the greatest problem was to obtain these integral skinned polyurethane foams reproducibly without any bubbles, blisters and other surface faults. In the meantime, it has been found that, in order to obtain moldings free from bubbles and, hence, faults, the medium-viscosity reaction mixture with the usual viscosities of from about 300 to 1,200 cP must be introduced into the mold in the complete absence of air bubbles. Air bubbles present in the reaction mixture cannot escape from the reaction mixture in the short reaction times and appear as cavities and faults in the finished molding. Faults formed by the collection of air bubbles on the surface of the molding are even more undesirable. Moldings of this kind cannot be used because of their appearance. Since it is only in exceptional cases that faults of this kind can be eliminated by complicated machining operations, the wastage caused by the inclusion of air bubbles in integral foam moldings is unfortunately still very high.

There has been no shortage of attempts to eliminate this phenomenon which is so detrimental both to the quality and to the economy of the manufacturing process.

In the most simple prior art case, the reaction mixture is allowed to flow slowly into an open mold so that it reaches the lowest point of the mold by laminar flow over a very gently inclined plane. Precautions have to be taken to prevent overrolling and a cascade-like flow pattern. It is clear that a method of this kind is not suitable for rational manufacture. This method calls for skilled, reliable personnel and involves the use of a reaction system having a long foaming initiation time, i.e. the period of time which elapses before the reaction mixture begins to foam. In cases where this process is carried out, the expensive molds are in service for extremely long periods, with the result that tooling costs are responsible for a large part of the production costs.

In many cases, it is not possible to introduce the reaction mixture into an open mold because the mold dividing plane lies at such a deep level that the reaction mixture would flow out of the mold cavity, or because the reaction mixture foams and hardens more quickly than the mold can be closed. For this reason, the closed mold is filled through an opening which is closed after the reaction mixture has been introduced.

In cases where the reaction mixture drops vertically through the inlet opening onto the bottom of the mold, it has been found that air is again entrained into the liquid stream, again producing the kind of faults referred to above.

In accordance with manual introduction of the reaction mixture into the open mold onto a gently inclined surface, a method was ultimately found of applying this desirable, laminar method of introduction to a closed mold under reproducible conditions:

The reaction mixture is brought up to the mold cavity through a circular or semicircular passage within the mold dividing plane, and introduced onto the lower, gently inclined surface of the mold through a gap 3 to 10 cm wide and 1 to 2 mm thick. This technique is known as "film gating" and also lends itself to automation.

In this method, the length of the gap and hence, the minimum length of the passage amounts to approximately 500 mm for moldings weighing 7 kg. The length of the gap has to increase with increasing weight of the molding, especially in cases where relatively high system reactivity levels are selected. One favorable measure of the rate of introduction in the film gap has proved to be a throughflow rate of 1 meter per second, although in exceptional cases maximum permissible rates of 3 meters per second have also been observed. These practical values relate to viscosities of the reaction mixture of the order of 600 cP.

The condition referred to above, namely flowing in through a 1 to 2 mm gap at a maximum inflow rate of 1 meter per second represents a very considerable limitation of the process. It is not possible to achieve extremely high flow rates. As a result, it is not possible to manufacture very large components from reaction mixtures of this kind which are highly reactive. Moreover, it is not possible to use extremely reactive systems with initiation times of around 1 second, i.e., with mold-filling times of less than 1 second, for small and medium sized moldings. The limitation of this filling method to moderately activated systems is a particular disadvantage because it precludes the possibility of extremely short and hence economical residence times in the mold which can only be achieved with the highly reactive mixtures.

It has been explained, that, for laminar introduction into the mold, the reaction mixture has to be guided through the aforementioned filling gap onto the lower, gently inclined surface of the mold cavity. To insure that this can always be applied, the mold has to be spatially arranged corresponding both to its configuration and to the position of the mold dividing plane for the filling process which only rarely can be freely selected. This means that, at present, almost every mold has to be filled in an empirically determined, preferred position. So far as large-scale manufacture is concerned, this means that the mold has to be held by swivel presses which can be spatially arranged in any position. However, these swivel presses involve considerable outlay in terms of adjustability, bearing strength and space requirement and, for this reason, make the polyurethane reaction injection-molding process inferior in this respect to other molding processes for plastics.

One disadvantage of the aforementioned process is the machinery required to set up the swivel presses and to restrict the rate of flow through a gap. However, one particular disadvantage is that material occupying the passage referred to above together with the film has to be regarded as waste because both the passage and the film fill up again with each mold-filling process and cannot be worked up again. This means that, for example in the production of a molding weighing 5 kg, non-reuseable waste can be expected to accumulate in a quantity of from 200 to 600 g, depending upon the activity of the polyurethane system employed.

It is therefore an object of the invention to provide a process in which there is no need for complicated swivel presses for setting up the mold in the optimum position and in which the residue of material left in the feed passage is negligible and which, in particular, makes it possible to use highly reactive reaction systems so that the periods for which the molds are in service can be shortened.

Other objects will become apparent from the following description with reference to the accompanying drawings wherein FIG. 1 shows a mold in which the wall thickness of the molding in the vicinity of the inlet openings directly satisfies the requirements.

Figure 1:
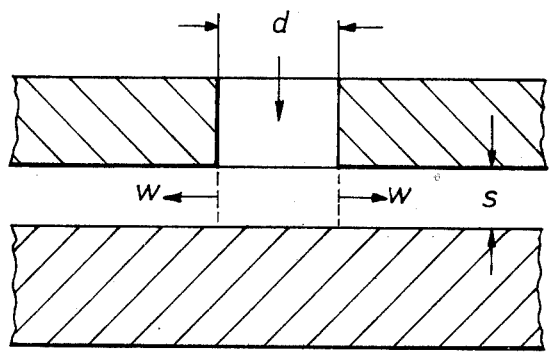

The foregoing objects and others are accomplished in accordance with this invention, generally speaking, by introducing a foamable reaction mixture having a viscosity $\eta$ between 100 cP and 2,500 cP into the cavity of a mold through an opening in the mold wall and against the opposite wall of the cavity while maintaining the space between the opening and foamable reaction mixture on the opposite wall between 0.5 and 15 mm so that the thickness $s$ of the molding adjacent the opening as the liquid is introduced is within the said range, allowing the mixture to flow radially over the wall of the cavity at a radial distribution rate $w_{radial}$ which combines with $s$ in mm and $\eta$ in cP to satisfy the following relation $$\frac{w_{radial} \text{ (m/sec.)} \cdot s \text{ (mm)}}{\eta \text{ (cP)}} \leq 0.5$$

and permitting the mixture to expand and solidify to form a foam product conforming to the configuration of the mold cavity.

It has been found that the above described disadvantages are obviated by virtue of the fact that the wall thickness $s$ of the molding in the vicinity of the inlet opening while the mixture is introduced is between 0.5 and 15 mm, and the wall thickness $s$ in mm and the radial distribution rate $w_{radial}$ of the reaction mixture in m/sec between the feed opening and the opposite mold wall and the viscosity $\eta$ of the reaction mixture in cP satisfies the following relation:

$$\frac{w_{radial} \text{ (m/sec)} \cdot s \text{ (mm)}}{\eta \text{ (cP)}} \leq 0.5$$

If these conditions are satisfied, air bubbles which produce voids and surface faults are avoided with some degree of certainty.

The radial distribution rate of the reaction mixture is calculated in accordance with the following formula:

$$w_{radial} = \frac{Q}{F} = \frac{Q}{U \cdot s} = \frac{Q}{\pi \cdot d \cdot s},$$

in which:
$Q$ = quantity of reaction mixture introduced (m³/sec),
$F$ = cylindrical flow surface between the inlet opening and opposite wall,
$d$ = diameter of the inlet opening (or feed passage) in mm,
$s$ = wall thickness in mm of the molding in the vicinity of the inlet opening at the time the mixture is introduced.
$u$ = the perimeter of circumference of the inlet opening (or feed passage) in mm.

Since, for reasons of reaction velocity, the viscosity of the reaction mixture cannot be directly measured, the viscosity has to be determined from the associated components in accordance with the following formula:

$$\eta_{mixture} = \frac{G_A \cdot \eta_A + G_B \cdot \eta_B}{G_A + G_B},$$

in which:
$\eta_{mixture}$ = viscosity of the mixture
$G_A$ = parts by weight of component A
$G_B$ = parts by weight of component B
$\eta_A$ = viscosity of component A
$\eta_B$ = viscosity of component B The mean-value formula for the viscosity of the mixture for more than two reaction components can also be built up in the same way.

The viscosities are preferably measured with a Hoppler viscometer as described in DIN 53 015 "Messung der Viskositat mit dem Kugelfallviskosimeter (nach Hoppler)" [Translation: "Measuring viscosity with a ball-drop viscosimeter (according to Hoppler)"].

By proceeding in accordance with the conditions stipulated above, it is possible with some degree of certainty to obtain moldings which do not include any air bubbles in the form of voids or surface faults.

For reasons of greater certainty, it is preferred to satisfy the following relation, especially in the case of very highly reactive reaction mixtures:

$$\frac{w_{radial} \text{ (m sec)} \cdot s \text{ (mm)}}{\eta \text{ (cP)}} \leq 0.1$$

The process is similarly optimized for the most stringent requirements by selecting a wall thickness $s$ of 1 to 8 mm for the molding.

The inflow angle is also a factor of some influence. In a preferred embodiment of the process, therefore, the feed passage forms an angle of 60° to 90° with that surface of the mold wall facing the inlet opening. However, this angle is preferably between 75° and 90°. These measures also contribute to optimizing the process according to the invention, especially in cases where highly reactive reaction mixtures are used.

Various embodiments of the process according to the invention are described by way of Example in the following with reference to the accompanying drawing which shows in section and in detail the area around the inlet opening of the mold.

Figure 2:
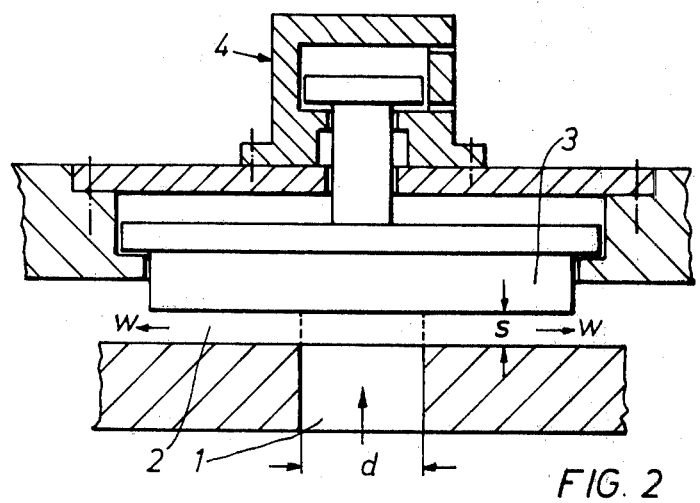
FIG. 2 shows a mold with an adjustable plate for correcting the wall thickness of the molding in the inlet zone.

The arrangement shown in FIG. 1 can be used for moldings with wall thicknesses of from 0.5 to 15 mm. In addition, it can also be used for the production of thicker moldings in cases where the wall thickness in the area around the inlet opening is kept within the limits according to the invention, or in cases where the wall thickness of the inflow opening is kept within the limits according to the invention by a suitable device, such as that shown in FIG. 2, at least during the mold-filling stage. One suitable device for keeping wall thickness within the aforementioned limits during the mold-filling stage is, as shown in FIG. 2, a displaceable cylinder or a membrane which maintains the comparatively low wall thicknesses during the mold-filling stage and is withdrawn immediately on completion of the mold-filling stage to allow the wall thickness to reach its final value. In this case, the reaction mixture enters the mold cavity 2 which has a wall thickness $s$ through a feed opening 1. At this stage, a plate 3 is in the illustrated position, in which it is kept by a hydraulic piston-and-cylinder unit 4. The surfaces of the plate 3 defining the mold cavity 2 are laid out in such a way that, on leaving the mold cavity with the thickness $s$, the flow front of the reaction mixture is moving at a rate of $w_{max} \leqslant 1$ m/second. On completion of the filling stage, the plate 3 is moved into its upper position by means of the piston and cylinder unit 4.

Figure 3:
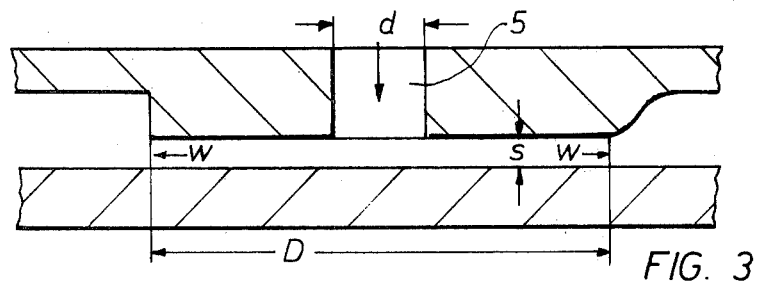
FIGS. 3 and 4 show reduced wall thicknesses in the inlet zone with different transitions to a normal wall thickness.

FIG. 3 shows differences in the thickness in the mold cavity. In this case, too, the distribution rate of the reaction mixture amounts to $w_{max}1$ m/second in the transition zone from lesser to greater thickness.

Figure 4:
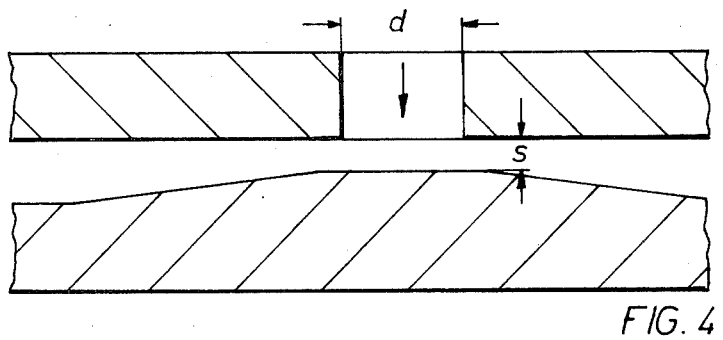

In FIG. 4, the molding undergoes a gradual increase in thickness from the sprue passage 5 in the thin zone $s$. This solution also provides positive gating results in the case of molds having a corresponding mold cavity.

Figure 5:
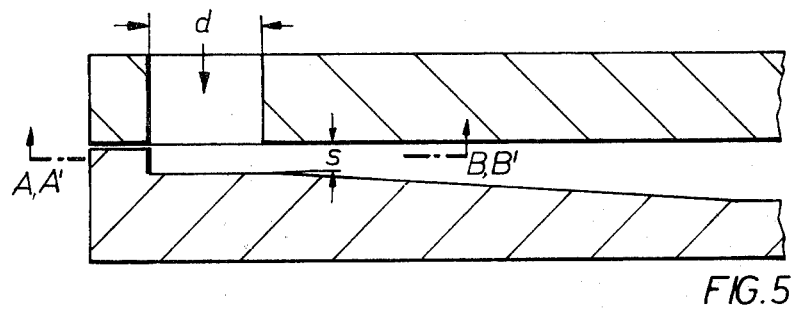
FIG. 5 shows a mold in which the inlet opening is arranged in one corner of the mold.
Figure 6:
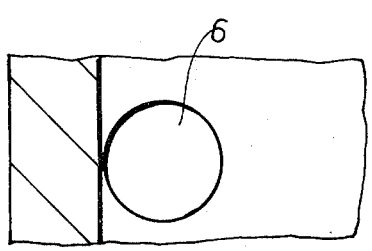
FIG. 6 is a section on the line A – B of FIG. 5 with a circular inlet opening.
Figure 7:
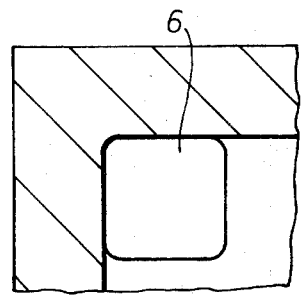
FIG. 7 is a section on the line A' – B' of FIG. 5 with a rectangular feed opening.

In FIGS. 5 to 7, the feed opening 6 is arranged at one edge (FIG. 6) and in one corner (FIG. 7) of the mold cavity. In this case, the feed openings 1 may be round (FIG. 6) or rectangular (FIG. 7). As shown in FIG. 7, they can also be adapted to the contour followed by the edges of the cavity, in other words they can be rectangular, oval, irregular, or any other suitable shape.

The effect obtained in accordance with the invention is demonstrated in the following Examples.

EXAMPLE 1

The following polyurethane formulation was used (elastic formulation):
Component A, $\eta = 500$ cP at 20°C
  88 parts by weight of polyether polyol
  8 parts by weight of trichloromonofluoromethane
  4 parts by weight of methylene chloride, wherein the polyether polyol has the following composition:
  91.0 parts by weight of polypropyleneglycol with an OH-number of 28
  3.2 parts by weight of triethanolamine
  2.8 parts by weight of tall oil
  0.2 parts by weight of H$_2$O
  3.3 parts by weight of permethylated methylaminopiperazine, as catalyst
Component B, $\eta = 50$ cP at 20°C
  carbodiimide-modified 4,4'-diphenylmethane diisocyanate, NCO-content: 30%
Recipe:
  100 parts by weight of Component A
  45 parts by weight of Component B
Determining the viscosity operand:

$$\eta_{mixture} = \frac{100 \cdot 500 + 45 \cdot 50}{145}$$

$$\eta_{mixture} = 362 \text{ cP}.$$

The viscosities of the individual components were measured with a Hoppler viscosimeter.
Filling conditions:
  wall thickness $s = 1$ mm
  filling at 20 lit./minute through a 10 mm diameter feed passage perpendicularly onto the opposite mold wall
  $w_{radial} = 10.6$ m/second
  $\eta = 362$ cP.

The filling passage has a horizontal axis. The molding is completely free from bubbles.
Checking of characteristics:

$$\frac{w \cdot s}{\eta} = \frac{10.6 \cdot 1}{362}$$

$$\frac{w \cdot s}{\eta} = 0.029$$

EXAMPLE 2

The following rigid polyurethane formulation was used:
Component A, $\eta = 800$ cP at 20°C.
  100 parts by weight of a polyether mixture, OH-number 500, consisting of a mixture of branched polyethers and linear polyethers stabilisers, additives and parting compounds by using Baydur B 611, a product of Bayer AG, Leverkusen, German Federal Republic.
  12 parts by weight of trichloromonofluoromethane
Component B, $\eta = 200$ cP at 20°C
  crude 4,4'-diphenylmethane diisocyanate, NCO-content: 28%
Recipe:
  112 parts by weight of Component A
  150 parts by weight of Component B
Determining the viscosity operand:

$$\eta_{mixture} = \frac{112 \cdot 800 + 150 \cdot 200}{262}$$

$$\eta_{mixture} = 495 \text{ cP}$$

Filling conditions:
  The wall thickness $s$ is 13 mm; 200 lit./min are introduced through a 20 mm diameter feed passage at an angle of 80° onto the opposite mold wall. The axis of the feed passage is vertical, the filling direction being directed downwards.
  $w_{radial} = 4.05$ m/seconds; $s = 13$ mm; $\eta = 495$ cP
  The molding is bubble-free.
Checking of characteristics:

$$\frac{w \cdot s}{\eta} = \frac{4.05 \cdot 13}{495}$$

$$\frac{w \cdot s}{\eta} = 0.106$$

EXAMPLE 3

The formulation corresponds to the formulation of Example 2. The inflow rate $w_{radial}$ is 22.4 m/second. The feed passage is directed perpendicularly onto the opposite wall. The axis of the feed passage extends at an angle of 45°. The wall thickness $s$ amounts to 5.8 mm. The molding shows localized bubbles.
Checking of characteristics:

$$\frac{w \cdot s}{\eta} = \frac{22.4 \cdot 5.8}{363}$$

$$\frac{w \cdot s}{\eta} = 0.368$$

EXAMPLE 4

The formulation used corresponds to the formulation of Example 2. Using the mold according to Example 3, the conditions are modified to the extent that the inflow rate $w_{radial}$ amounts to 19.8 m/second, and the wall thickness in the vicinity of the gate is reduced to $s = 4$ mm in a radius of 60 mm around the feed opening. The molding reaches a wall thickness of $s = 5.8$ mm in a radius of 100 mm around the feed opening. It is completely free from bubbles.
Checking of characteristics:

$$\frac{w \cdot s}{\eta} = \frac{19.8 \cdot 4}{363}$$

$$\frac{w \cdot s}{\eta} = 0.22$$

The molding remains satisfactory when the inflow rate is further reduced to 14 m/second.

The process provided by the invention may be practiced in molding any suitable foamable reaction mixture which will produce a polyurethane, polyurea or polyisocyanurate foam molding. Examples of suitable reaction mixtures are disclosed, for example, in the book *Polyurethanes: Chemistry and Technology* by Saunders and Frisch, published by Interscience Publishers.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for filling molds with reaction mixtures having viscosities in the range from 100 cP to 2500 cP, the reaction mixture flowing through a feed passage into a closed mold cavity onto that wall of the mold opposite the feed opening and being distributed around the mold cavity by flowing radially downwards, wherein the wall thickness $s$ of the molding in the vicinity of the inlet opening and at the point in time at which the mixture is introduced amounts to between 0.5 and 15 mm, this wall thickness $s$ in mm, the radial distribution rate $w_{radial}$ of the reaction mixture in m/second between the feed opening and the opposite wall of the mold and the viscosity $\eta$ of the reaction mixture in cP satisfying the following relation:

$$\frac{w_{radial} \text{ (m/sec.)} \cdot s \text{ (mm)}}{\eta \text{ (cP)}} \leq 0.5$$

2. A process as claimed in claim 1, wherein the following relation is satisfied:

$$\frac{w_{radial} \text{ (m/sec.)} \cdot s \text{ (mm)}}{\eta \text{ (cP)}} \; 0.1$$

3. A process aas claimed in claim 1, wherein the wall thickness $s$ amounts to between 1 and 8 mm.

4. A process as claimed in claim 1, wherein the feed passage forms an angle of 60° to 90° with that surface of the mold wall opposite the feed opening.

5. A process as claimed in claim 1, wherein the angle is between 75° and 90°.

6. A process for molding a foam plastic which is substantially free from flaws caused by air bubbles in the foamable reaction mixture which comprises introducing a foamable reaction mixture having a viscosity $\eta$ of 100 cP to 2500 cP into a cavity of a mold through an opening against the wall of the cavity opposite the opening while maintaining the distance from the opening to the opposite wall, the wall thickness $s$ at between about 0.5 to 15 mm and while maintaining the flow rate Q; reaction mixture viscosity $\eta$, and equivalent inlet opening diameter $d$ such that the relationship $$\frac{w_{radial} \text{ (m/sec)} \cdot s \text{ (mm)}}{\eta \text{ (cP)}} \; 0.5$$

is satisfied where $$w_{radial} \text{ (m/sec)} = \frac{Q \text{ (m}^3\text{/sec)}}{\pi \, d \text{ (m)} \cdot s \text{ (m)}}$$

until the proper amount of reaction mixture has been introduced into the mold and allowing the mixture to expand and fill the mold cavity with a solid foam product.

* * * * *